United States Patent
Nagai

[11] Patent Number: 6,081,405
[45] Date of Patent: Jun. 27, 2000

[54] MAGNETIC RECORDING AND REPRODUCING DEVICE HAVING A DRIVING ROLLER ROTATED BY A MOTOR OF LOW TORQUE WHICH IS PRESS CONTRACTED WITH A TRANSFER ROLLER OF A CARTRIDGE AND TRANSFERS A MAGNETIC TAPE

[75] Inventor: Seiichi Nagai, Miyagi-ken, Japan

[73] Assignee: Alps Electric Co., Ltd., Japan

[21] Appl. No.: 09/116,108

[22] Filed: Jul. 15, 1998

[30] Foreign Application Priority Data

Jul. 17, 1997 [JP] Japan ................................ 9-192882

[51] Int. Cl.⁷ ................................................ G11B 15/60
[52] U.S. Cl. .......................................................... 360/96.5
[58] Field of Search .......................... 360/93, 96.1, 96.5; 242/338.4, 352, 352.4

[56] References Cited

U.S. PATENT DOCUMENTS

| | | | |
|---|---|---|---|
| 5,025,334 | 6/1991 | Perona et al. ........................ | 360/96.5 |
| 5,272,579 | 12/1993 | Ohkubo et al. ....................... | 360/96.5 |
| 5,371,642 | 12/1994 | Bryer .................................... | 360/96.5 |
| 5,373,406 | 12/1994 | Jansen ................................... | 360/96.5 |
| 5,448,432 | 9/1995 | Saga et al. ............................ | 360/96.5 |
| 5,557,485 | 9/1996 | Stephens et al. ..................... | 360/96.5 |
| 5,568,340 | 10/1996 | Chiou et al. .......................... | 360/96.5 |
| 5,629,816 | 5/1997 | Busengdal et al. ................... | 360/96.5 |
| 5,652,683 | 7/1997 | Bryer .................................... | 360/96.5 |
| 5,699,209 | 12/1997 | Koizumi ............................... | 360/96.5 |
| 5,737,147 | 4/1998 | Standiford ............................ | 360/96.3 |
| 5,751,529 | 5/1998 | Stephens et al. ..................... | 360/128 |
| 5,757,579 | 5/1998 | Koizumi ............................... | 360/96.5 |

FOREIGN PATENT DOCUMENTS

| | | |
|---|---|---|
| 394 581 A2 | 10/1990 | European Pat. Off. . |
| 562 390 A2 | 9/1993 | European Pat. Off. . |
| WO 98/18124 | 4/1998 | Netherlands . |

*Primary Examiner*—Jefferson Evans
*Attorney, Agent, or Firm*—Brinks, Hofer, Gilson & Lione

[57] ABSTRACT

The magnetic recording and reproducing device of the present invention is made such that after the transfer roller and the driving roller are press contacted to each other, the slide member is slid to cause the aforesaid transfer roller to be moved in a direction away from the aforesaid driving roller.

11 Claims, 8 Drawing Sheets

MAGNETIC RECORDING AND REPRODUCING DEVICE HAVING A DRIVING ROLLER ROTATED BY A MOTOR OF LOW TORQUE WHICH IS PRESS CONTRACTED WITH A TRANSFER ROLLER OF A CARTRIDGE AND TRANSFERS A MAGNETIC TAPE

BACKGROUND OF THE INVENTION

This invention relates to a magnetic recording and reproducing device, and more particularly a mechanism for holding a cartridge storing a magnetic tape therein. 2.

Referring to a top plan view of FIG. 15, FIG. 16A of a sectional view taken along a line A—A of FIG. 15 and FIG. 16B of a side elevational view for showing a substantial part of the device, a magnetic recording and reproducing device 21 of the prior art will be described.

At first, the magnetic recording and reproducing device 21 of the prior art (hereinafter called as the device 21) is made such that a pair of guide members 21b, 21c having a U-shaped groove are fixed to a base plate 21a while being opposite to an upper end and a lower end shown in FIG. 15.

Figure 16A:
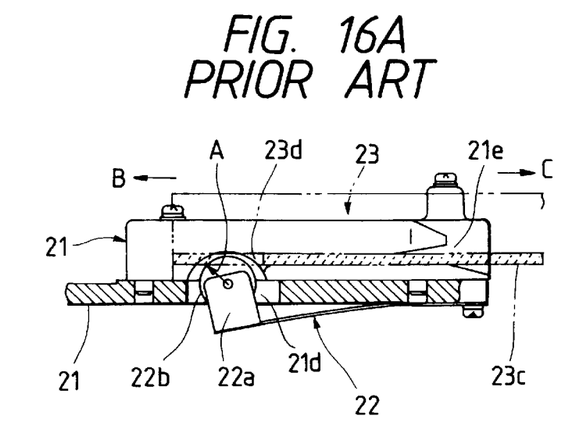
FIGS. 16a and 16b are a sectional view for showing a substantial part and a side elevational view for showing a substantial part of a magnetic recording and reproducing device of the prior art.

In addition, as shown in FIG. 16A, a pair of openings 21d are formed at a part of the base plate 21a where a pair of aforesaid guide members 21b, 21c are positioned.

Additionally, an insertion port 21e for use in inserting a cartridge 23 to be described later into the device 21 is formed at a right side end shown in FIG. 16A.

Within the device 21 is arranged each of a magnetic head 26 and a driving roller 27 or the like rotated in response to a rotation of a driving motor (not shown).

In addition, at the rear surface of a portion on the base plate 21a where the guide members 21b, 21c are positioned are arranged a pair of leaf springs 22 of which one end is fixed with a screw and the other end is a free end having a high resilient force therein. An engaging portion 22a is formed at the extremity end of the free end of the leaf spring 22 and an engaging roller 22b is rotatably held at the engaging portion 22a, The engaging roller 22b is inserted into the opening 21d of the base plate 21a, the engaging roller 22b can be moved up and down within the opening 21d around a fulcrum point of the screw set part with a pushing-down force applied to the engaging roller 22b due to a strong resilient force of the leaf spring 22.

Figure 16B:
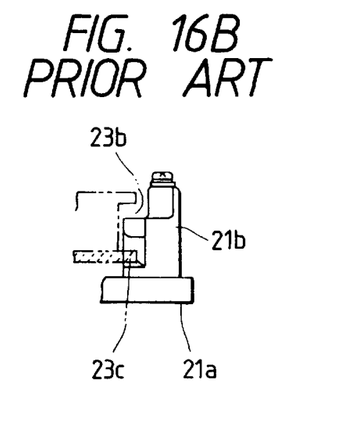

In addition, a cartridge 3 shown by a two-dotted line in the figure which is inserted through the insertion port 21e, guided by the guide members 21a, 21b and loaded within the device 21 stores a magnetic tape 23a therein, and its both side surfaces are formed with a pair of U-shaped guide grooves 23b as shown in FIG. 16B.

Then, the pair of guide grooves 23b are guided by the guide members 21b, 21c to cause the cartridge 23 to be guided into the device 21.

Additionally, a part of a bottom plate 23c constituting the guide groove 23b of the cartridge 23 is formed with a recess 23d.

In addition, within the cartridge 23 are arranged a transfer roller 23f and reels 24, 25 around which the magnetic tape 23a is wound.

Then, as the transfer roller 23f is rotated, the reels 24, 25 are rotated by a transfer means not shown to enable the magnetic tape 23a to be transferred.

Operation for loading the aforesaid cartridge 23 to the device 21 is carried out such that at first the extremity end of the cartridge 23 is manually inserted in a direction indicated by an arrow B from the insertion port 21e of the device 21.

Then, the extremity end of the bottom plate 23c of the cartridge 23 strikes against the engaging roller 22b of the leaf spring 22 and the cartridge 23 stops during its inserting operation.

Then, as the cartridge 23 is pushed into the device 21 with a further strong force, the engaging roller 22b is pushed down and the cartridge 23 is moved in a direction indicated by an arrow B and inserted into the device 21.

Then, the transfer roller 23f is forcedly contacted with the driving roller 27, motion of the cartridge 23 in the direction indicated by the arrow B stops and the magnetic head 26 is kept contacted with the surface of the magnetic tape 23a.

In addition, the aforesaid engaging roller 22b is positioned at the recess 23d of the cartridge 23, ascends by a resilient force of the leaf spring 22 and the engaging roller 22b is resiliently contacted with one end of the recess 23d as shown in FIG. 16A.

Then, one end of the recess 23d is pushed by the engaging roller 22b in a direction (45°) of the arrow A and the cartridge 23 is fixed in the device 21 so as not to be pulled off and held there. At this time, a pressing force of the transfer roller 23f of about 0.5 to 1 Kgf is applied to the driving roller 27.

Then, as the transfer roller 23f is press contacted with the driving roller 27, a cartridge detecting sensor not shown is operated, the driving roller 27 is rotated through rotation of the driving motor not shown in reference to an instruction attained from an external computer (not shown), the rotation of the driving roller 27 is transmitted to the reels 24, 25 through the transfer roller 23f, the magnetic tape 23a is transferred through rotation of the reels 24, 25, resulting in that either recording or reproducing operation can be carried out.

Figure 15:
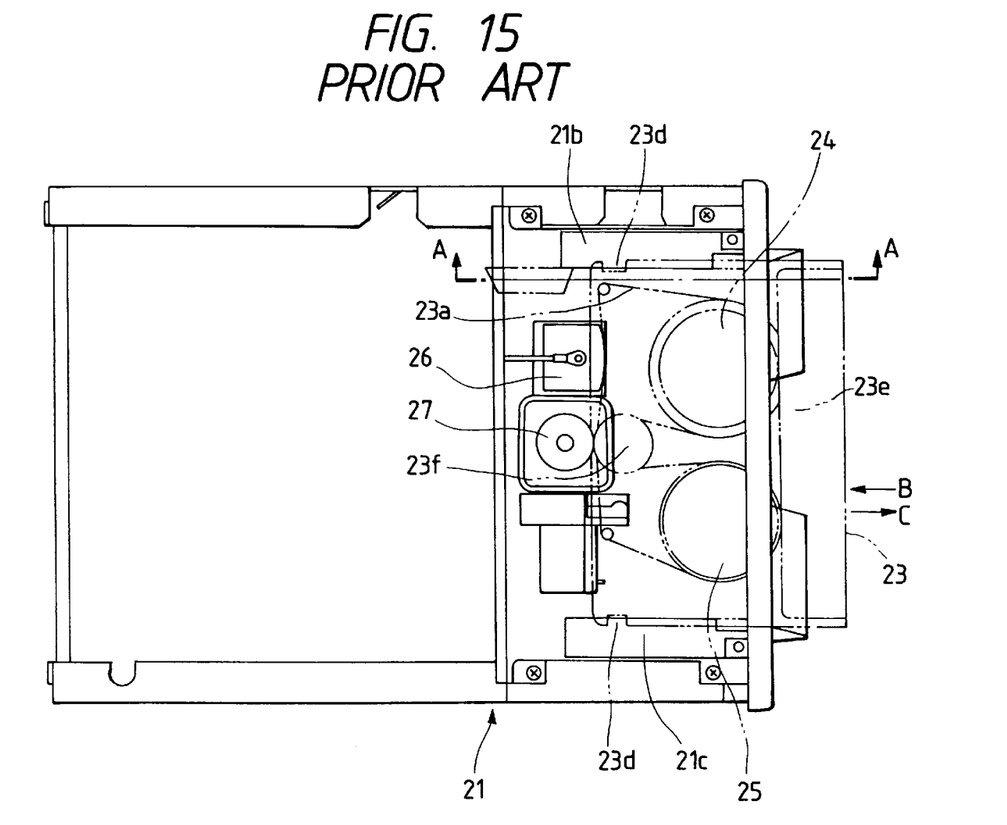
FIG. 15 is a schematic top plan view for showing a magnetic recording and reproducing device of the prior art.

Additionally, when the cartridge 23 is pulled out of the device 21, the rear end 23e of the cartridge 23 protruded out of the device 21 shown in FIG. 15 is pulled out strongly in a direction indicated by an arrow C, resulting in that the engaging roller 22b of the engaging part 22a is removed from the recess 23d of the cartridge 23 and then the cartridge 23 can be pulled out of the device 21.

However, when the cartridge 23 was loaded in the magnetic recording and reproducing device 21 of the prior art as described above, the transfer roller 23f of the cartridge 23 was press contacted with the driving roller 27 by a strong force, resulting in that an energizing torque of the driving roller 27 was increased and the driving roller 27 could not be normally energized for rotation.

Due to this fact, as the driving motor (not shown) for rotating the driving roller 27, a motor with a high torque had to be used.

Thus, the prior art had a problem that application of the motor having such a high torque caused the magnetic recording and reproducing device 21 to have an increased cost and its consumption power was also increased.

SUMMARY OF THE INVENTION

The magnetic recording and reproducing device of the present invention acting as a first means for solving the problem is constructed such that there are provided a cartridge storing a magnetic tape therein and having a transfer roller for transferring the magnetic tape, a driving roller press contacted with the transfer roller and rotationally driving the transfer roller, and a slide member engaged with the cartridge to cause it to be slidingly moved, wherein the cartridge is slidingly moved toward the aforesaid driving roller so as to press contact the transfer roller and the driving roller from each other while the cartridge is being engaged with the slide member and then the driving roller and the transfer roller are spaced apart or a press contacting force between both rollers is weakened.

In addition, as a second means solving the problem, the present invention is made such that after the driving roller and the transfer roller are spaced apart or the press contact force between the both rollers is weakened, the driving roller is rotated by a predetermined number of rotation, subsequently both rollers are approached again to increase the press contact force between the driving roller and the transfer roller and the transfer roller is rotated through rotation of the driving roller.

Additionally, as a third means for solving the problem, the present invention is made such that moving the driving roller and the transfer roller away from each other, or decreasing the press contact force between both rollers, and/or approaching both rollers to each other so as to increase the press contact force between the driving roller and the transfer roller is carried out by motion of the transfer roller through sliding movement of the slide member.

Additionally, as a fourth means for solving the problem, the present invention is made such that moving the driving roller and the transfer roller away from each other, or decreasing the press contact force between the both rollers, and/or approaching both rollers to each other so as to increase the press contact force between the driving roller and the transfer roller is carried out by movement of the driving roller.

DESCRIPTION OF THE PREFERRED EMBODIMENT

A schematic configuration of one preferred embodiment of the magnetic recording and reproducing device 1 (hereinafter called as a device 1) of the present invention is made such that, as shown in the perspective views of FIGS. 1 and 2, there are provided a casing 2 of which outer shape is formed into a substantial rectangular shape and having various components to be described later fixed therein, and a cover 13 for closing the upper part of the casing 2 like a lid, wherein an openable or closable lid is fixed to the front side cartridge insertion port 1a so as to prevent dust or the like from entering the casing 2.

The side surface of the cartridge 4 to be loaded in the device 1 is formed with guide sections 4e, 4f at its upper and lower orientation for use in guiding the cartridge into the device 1. Then, the lower guide section 4e is provided with an engaging part 4g to which an engaging part of a slide member 3 to be described later is engaged so as to cause the cartridge 4 to be engaged with the device 1.

Figure 2:
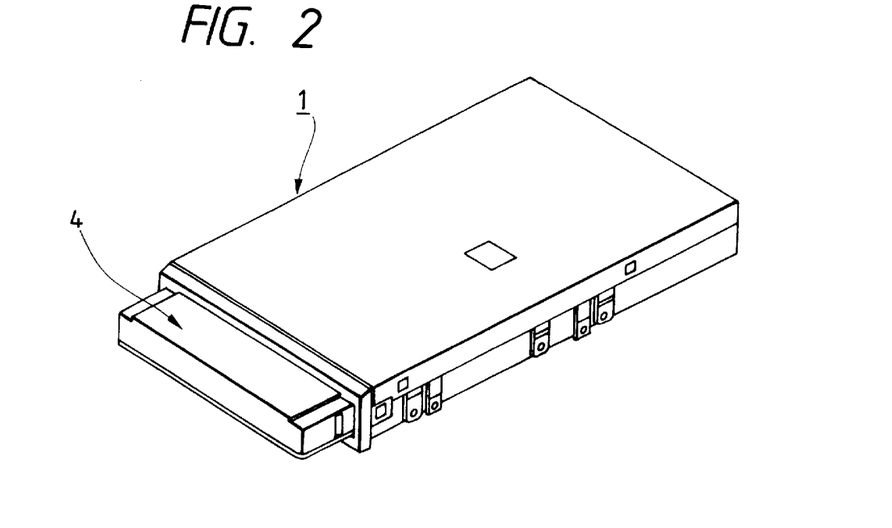
FIG. 2 is a schematic perspective view for showing a magnetic recording and reproducing device of the present invention in which a cartridge is loaded.

In addition, FIG. 2 is an outer appearance view for showing a state in which the engaging part 3 of the slide member 3 to be described later is engaged with the engaging part 4g of the cartridge 4 and the cartridge 4 is engaged with the device 1 and loaded there.

Referring to FIGS. 3 to 14, a detailed configuration of the device 1 described above will be explained as follows.

Figure 3:
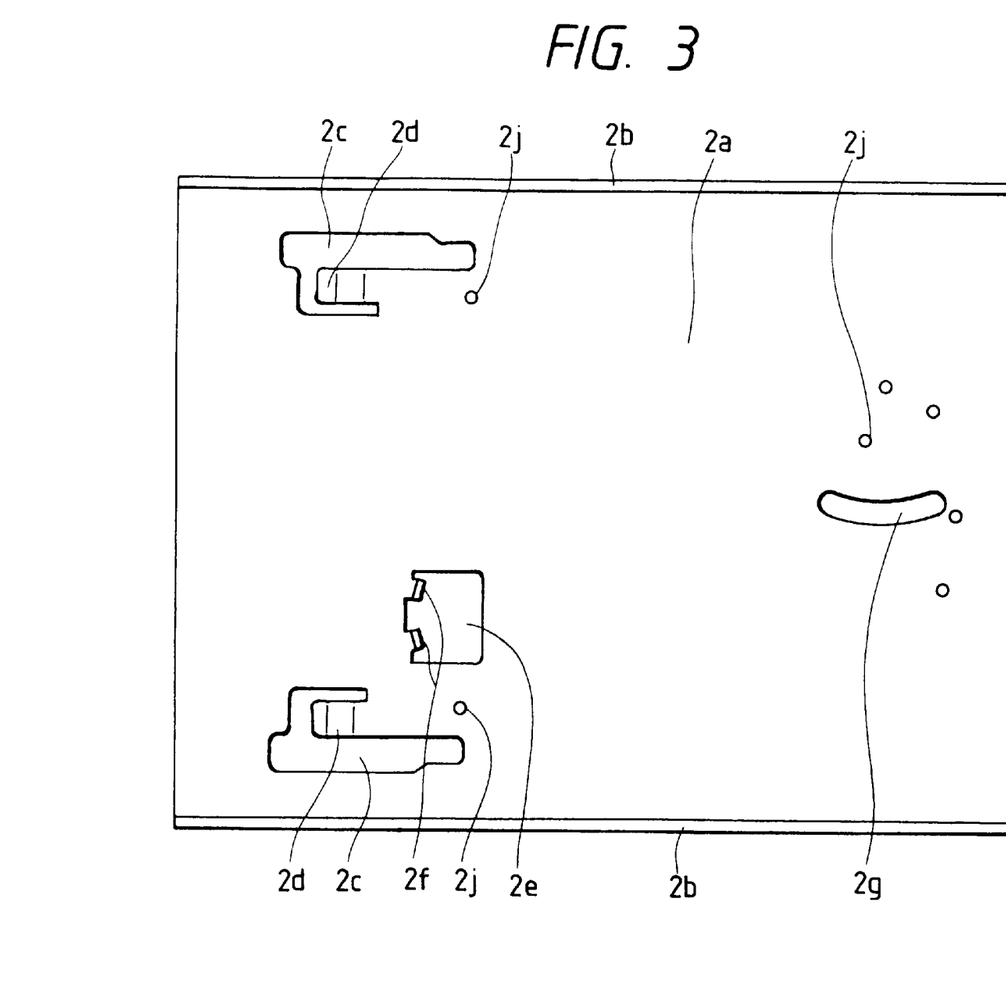
FIG. 3 is a developed top plan view for showing a casing of a magnetic recording and reproducing device of the present invention.
Figure 4:
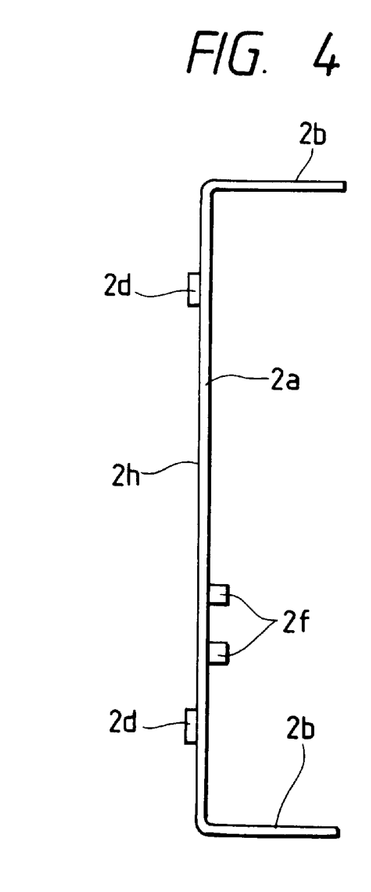
FIG. 4 is a side elevational view for showing a casing of a magnetic recording and reproducing device of the present invention.

At first, as shown in a top plan view of FIG. 3 and a side elevational view of FIG. 4, an outer shape of the casing 2 composed of a metallic plate or the like is formed into a rectangular shape, wherein the casing 2 is formed with a bottom plate 2a and side plates 2b, 2b bent at the same side while both upper and lower end portions of the bottom plate 2a as viewed in the figure are being oppositely faced to each other.

Figure 5:
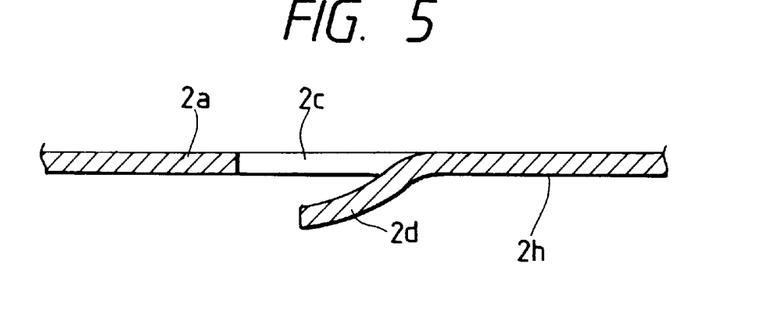
FIG. 5 is a sectional view for showing a substantial part of a cam section of a casing of a magnetic recording and reproducing device of the present invention.

Then, a pair of openings 2c, 2c punched by a press or the like are formed at upper and lower two locations near a left side of the bottom plate 2a shown in FIG. 3 as viewed in the figure and the openings 2c, 2c are formed with tongue-like cam portions 2d, 2d. As shown in FIG. 5, the cam portions 2d, 2d are protruded from the bottom plate 2a and formed in a slant downward direction.

In addition, a substantial rectangular-shaped head position setting hole 2e is formed by a punching operation near the lower opening 2c between the two openings 2c, 2c shown in FIG. 3, and two stoppers 2f are cut, raised up and formed at the left side surface of the head position setting hole 2e.

Further, an arcuate guide groove 2g is formed at a substantial central part near the right end side shown in FIG. 3 while being passed through the bottom plate.

Additionally, each of rivet fixing holes 2j is formed near the openings 2c, 2c and the arcuate guide groove 2g at the bottom plate 2a, respectively. A plurality of round holes of small diameter are formed around the aforesaid guide groove 2g.

In addition, a slide member 3 is arranged at a rear surface 2h of the bottom plate 2a while it is being contacted with the rear surface 2h.

Figure 6:
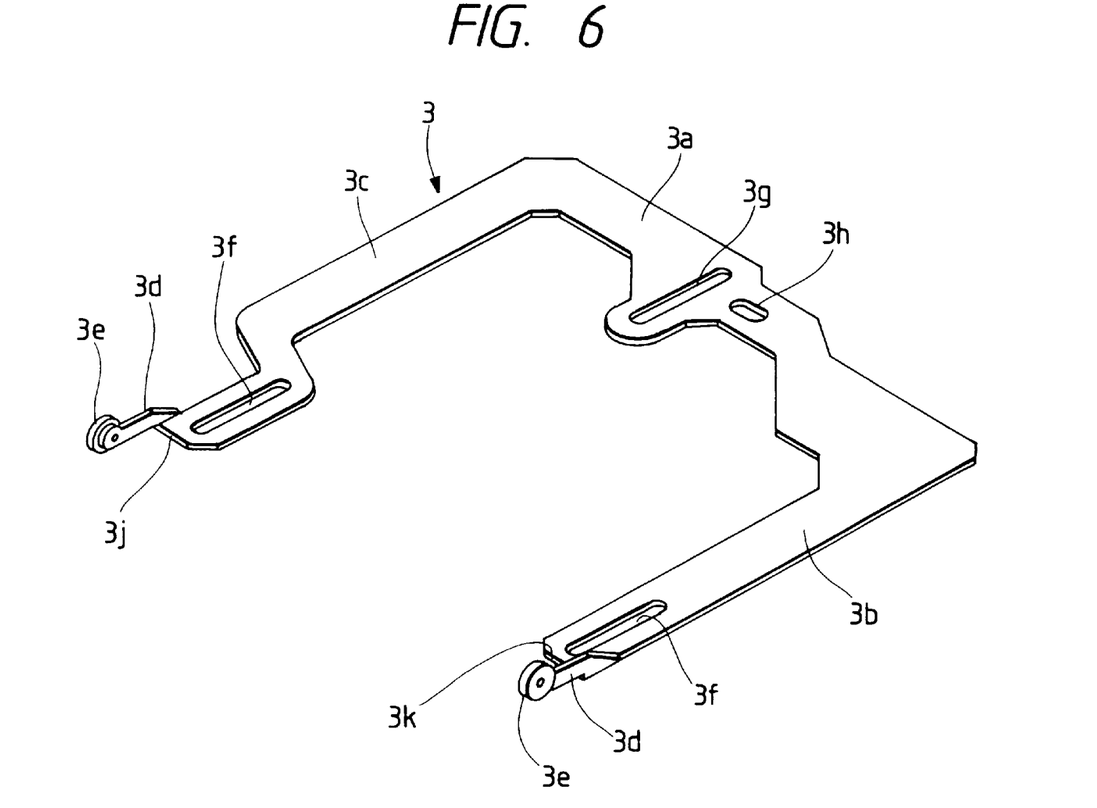
FIG. 6 is a perspective view for showing a slide member of a magnetic recording and reproducing device of the present invention.

The slide member 3 is composed of a resilient metallic plate such a stainless steel plate, and as shown in a perspective view of FIG. 6, arm portions 3b, 3c extending from both right and left sides of the base part 3a in a forward direction are formed in the same length and their outer shapes are formed in a substantial U-shaped form.

The extremity ends of the arms 3b, 3c are formed with linear-shaped ends 3j, 3k in a direction crossing at a right angle with an extending direction of each of the arms 3b, 3c. At an outside part of each of the arms 3b, 3c to which the ends 3j, 3k are contacted, each of a pair of roller holding sections 3d is bent at a right angle and formed while being oppositely faced from each other in an upward direction as viewed in the figure. Then, the roller holding sections 3d, 3d are formed to be extended fowardly from the ends 3j, 3k.

In addition, the extremity ends of the pair of roller holding sections 3d, 3d are formed with engaging sections, wherein the engaging sections are comprised of roller-shaped engaging rollers 3e, 3e made of metal and each of them is rotatably supported by its own shaft.

Additionally, each of a pair of punched and elongated slide grooves 3f, 3f is formed while being in parallel to each other near the ends 3j, 3k of the arm sections 3b, 3c, respectively.

In addition, a slide groove 3g punched and formed in parallel with the aforesaid slide grooves 3f, 3f is arranged at a substantial central part of the base section 3a. Further, an ellipse opening groove 3h is formed near the right side of the slide groove 3g in a direction crossing at a right angle with the slide groove 3g.

Figure 10:
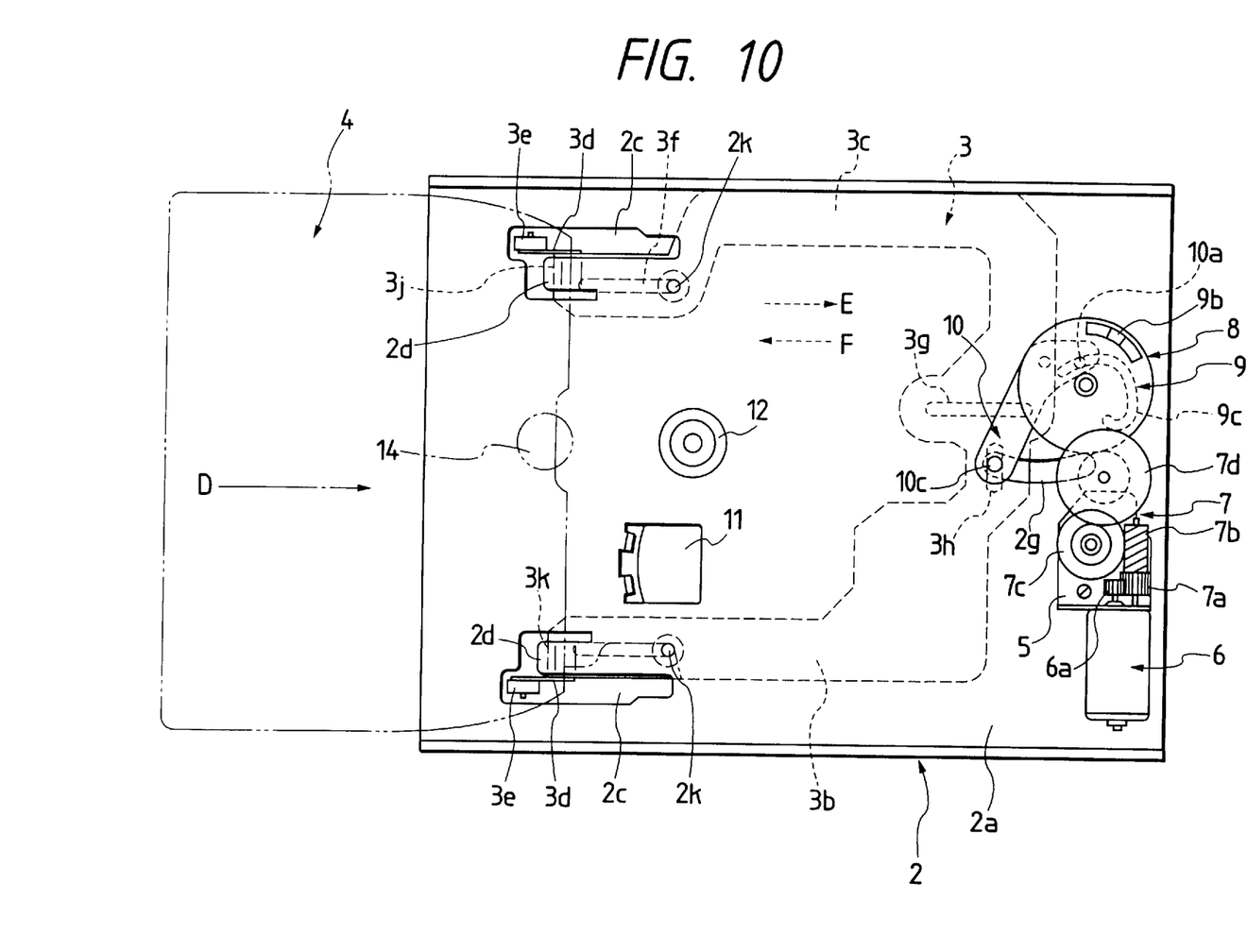
FIG. 10 is a top plan view of a substantial part for illustrating an operation of a magnetic recording and reproducing device of the present invention.
Figure 11:
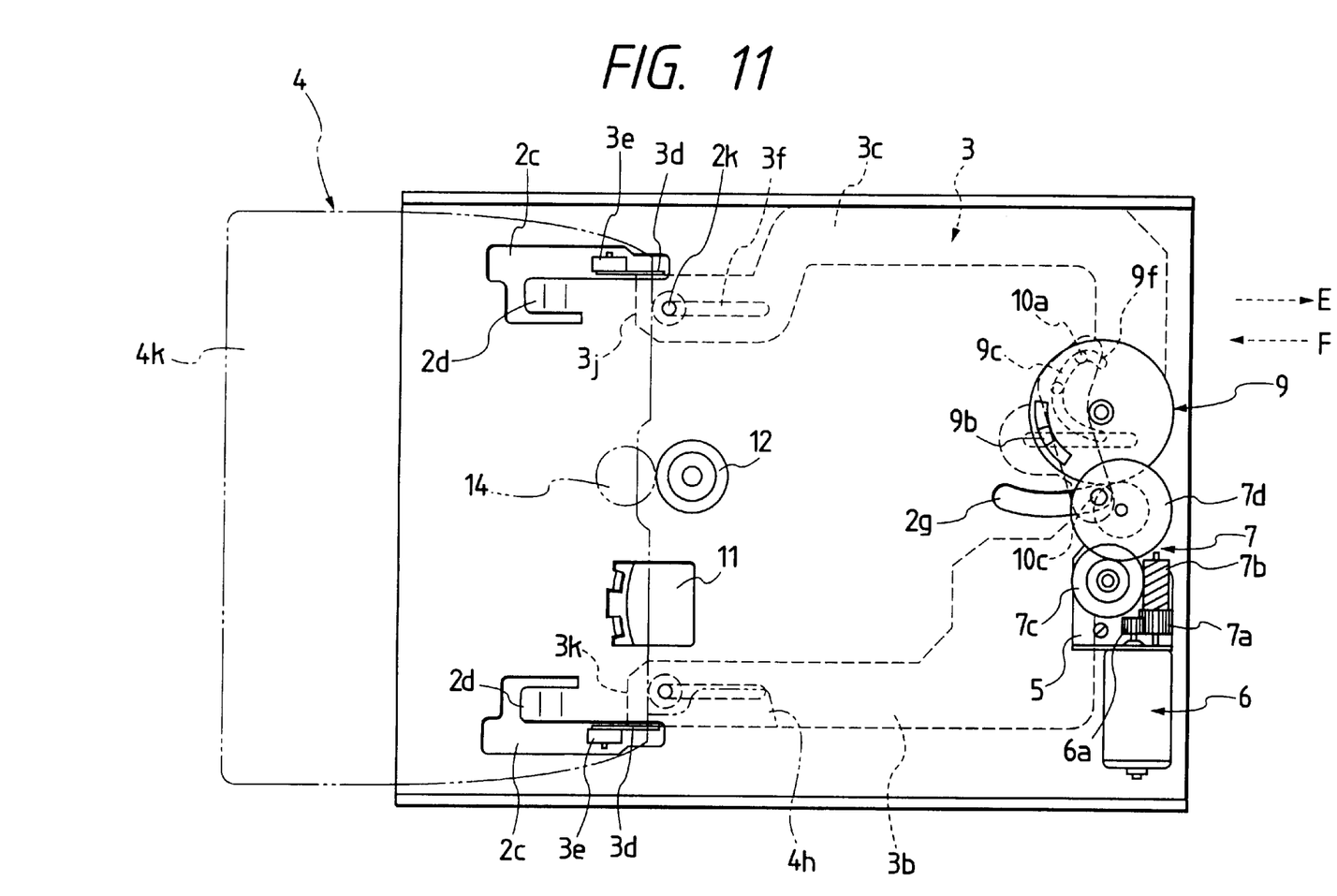
FIG. 11 is a top plan view of a substantial part for illustrating an operation of a magnetic recording and reproducing device of the present invention.

As shown in FIGS. 10 and 11, the slide member 3 having such a configuration as above is arranged at the rear surface 2h of the bottom plate 2a of the casing 2 and this is slidably attached to the bottom plate 2a through rivets 2k.

In order to fix the slide member 3 to the bottom plate 2a, the casing 2 shown in FIG. 3 is turned over to cause its rear surface 2h to be set upward, the roller holding sections 3d having the engaging rollers 3e of the slide member 3 fixed thereto are aligned in their positions and inserted into the two openings 2c of the bottom plate 2a.

Figure 12:
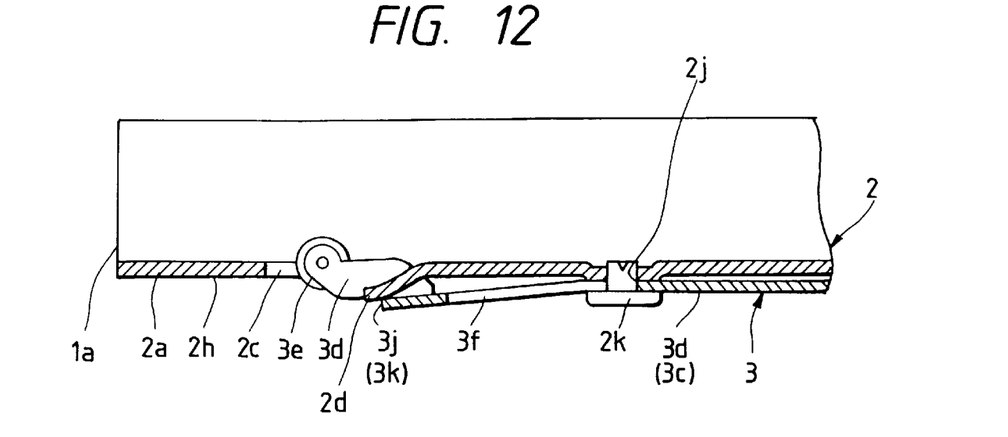
FIG. 12 is a sectional view of a substantial part for illustrating an operation of a cam part of a casing in a magnetic recording and reproducing device of the present invention.

Then, front ends 3j, 3k of the slide member 3 are aligned in their positions in such a way that they may not ride over the slant section of each of the cam sections 2d of the bottom plate 2a, the three rivet fixing holes 2j are aligned in their positions with each of the slide grooves 3f, 3f, 3g, and the extremity end of the rivet 2k having a large diameter head as shown in FIG. 12 is inserted into each of the slide grooves 3f, 3f, 3g and each of the three rivet fixing holes 2j.

When the rivet 2k inserted into the rivet fixing hole 2j of the casing 2 is calked with a calking jig not shown, the rivet 2k is fixed to the bottom plate 2a of the casing 2 and attached there. Then, the slide member 3 is slidably attached to the rear surface 2h of the casing 2.

Figure 7A:
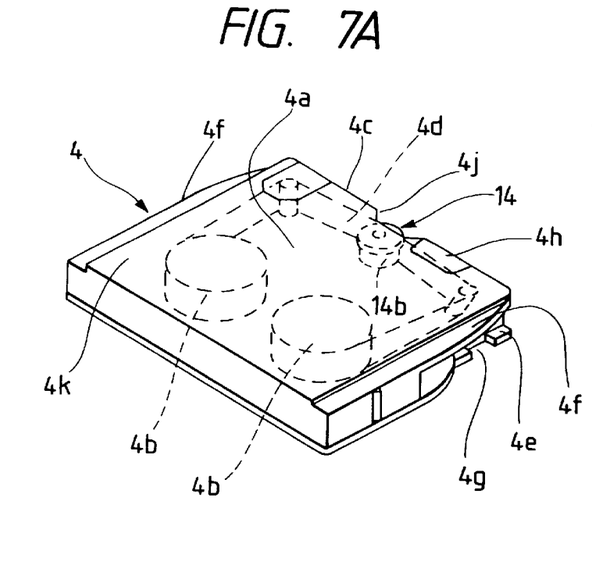
FIGS. 7a and 7b are a perspective view for showing an outer appearance of a cartridge and a side elevational view for showing a transfer roller to be used in a magnetic recording and reproducing device of the present invention.

In addition, as shown in FIG. 7A, the cartridge 4 loaded in the device 1 is made such that it has a magnetic tape 4d is wound around a pair of rotatable reels 4b, 4b and stored within a case 4a covered at its circumference.

Additionally, the central part of the front surface side 4c of the aforesaid case 4a is formed with a recess 4j and a part of the outer circumference of the transfer roller 14 is exposed in the recess 4j and contacted with it.

In addition, as the transfer roller 14 is rotated by a rotating means to be described later, this rotation is transmitted to the aforesaid reels 4b, 4b through a transmittance means not shown, the reels are rotated in a predetermined direction and the magnetic tape 4d is wound up by the reel 4b and transported.

Further, at both right and left outer side surfaces of the case 4a are formed with guide sections 4e, 4f for guiding the cartridge 4 within the device 1 in a vertical orientation as viewed in the figure.

In addition, at the aforesaid lower guide section 4e, cut and formed engaging sections 4g are formed at each of both right and left guide sections 4e, respectively.

Additionally, at the right side of the front surface 4c of the cartridge 4 as viewed in the figure is arranged a rotatable lid 4h capable of opening or closing the right front surface of the cartridge 4. This lid 4h opens forwardly when the cartridge 4 is inserted into the device 1, a part of the front surface side 4c of the cartridge 4 is released, the magnetic tape 4d is exposed at this released part, resulting in that the magnetic head 11 to be described later can be slidingly contacted with the tape.

Figure 7B:
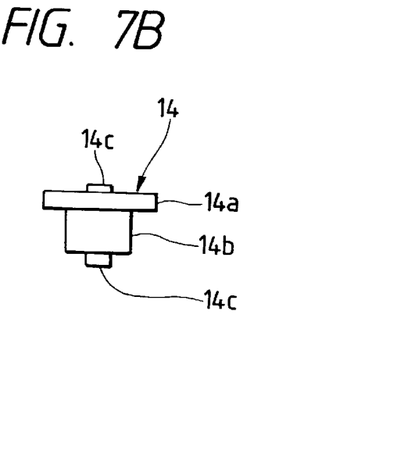

In addition, as shown in FIG. 7B, the transfer roller 14 is made such that its outer shape is formed as a stepwise roller and this is formed with a large diameter flange section 14a at its upper part and a smaller stepwise section 14b than an outer diameter size of the flange section 14a below the flange section 13a.

Additionally, each of supporting sections 14c is projected and formed at an upper surface of the flange section 14a and at a lower surface of the stepped section 14b, respectively, and then the transfer roller 14 is rotatably attached within the case 4a by the supporting sections 14c.

As shown in FIG. 10, a fixing plate 5 is fixed to the right side of the bottom plate 2a at the casing 2 by a screw or the like and a driving source, a motor 6, for example, for use in slidingly moving the slide member 3 is fixed to the fixing plate 5.

A pinion gear 6a is fixed to the shaft of the motor 6 and a rotation of the motor 6 is transmitted to a group of gears 7 through the pinion gear 6a.

The group of gears 7 are constructed such that a worm gear 7b integrally formed with the pinion gear 7a and pinion gears 7c, 7d having two pinion gears with different diameters integrally formed to each other are engaged from each other and pivotally supported at a small diameter hole around the guide groove 2g of the bottom plate 2a of the casing 2.

Then, as the motor 6 is rotated, a rotating motion is transmitted to a cam mechanism 8 having a spur gear 9 through the group of gears 7.

Figure 8A:
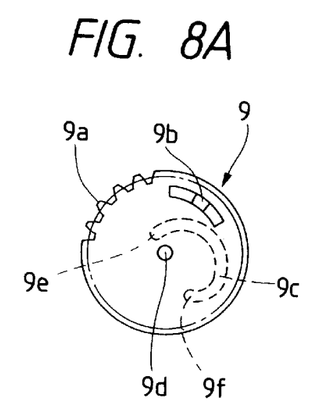
FIGS. 8a, 8b and 8c are a front elevational view, a side elevational view and a bottom view for showing a spur gear in a magnetic recording and reproducing device of the present invention.
Figure 8B:
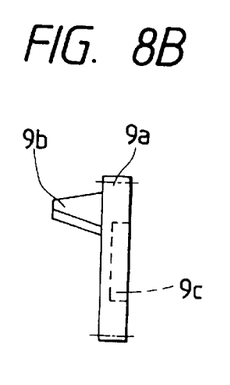
Figure 8C:
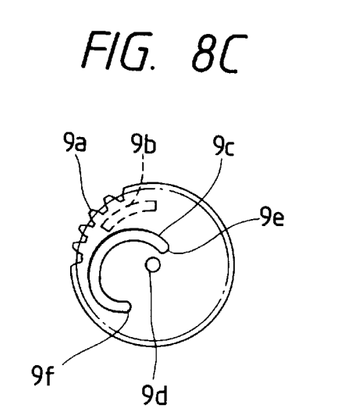

In addition, the cam mechanism 8 is comprised of the spur gear 9 and a cam plate 10, wherein the spur gear 9 has a circular outer shape and is formed with a plurality of threads 9a at its outer circumference, a gear of small diameter of the pinion gear 7d is engaged with the threads 9a so as to cause a rotation of the aforesaid motor 6 to be transmitted to the cam mechanism 8. In addition, a substantial triangular shaped protrusion 9b is projected and formed near an outer circumference of the surface of the spur gear 9.

In addition, at the rear surface of the spur gear 9 is formed with a substantial arcuate-shaped cam groove 9c such that one end 9e is formed near a central hole 9d and the other end 9f is formed near outer circumferential threads 9a, wherein the groove 9c is formed in a predetermined width and depth from one end 9e to the other end 9f.

Additionally, the other end 9f of the cam groove 9c is slightly bent and formed from the outer-most circumference of the threads 9a toward the aforesaid central hole 9d.

In addition, the cam mechanism 8 is provided with a rotatable cam plate 10 converting a rotational motion of the spur gear 9 into a linear motion between the spur gear 9 and the bottom plate 2a of the casing 2.

Figure 9:
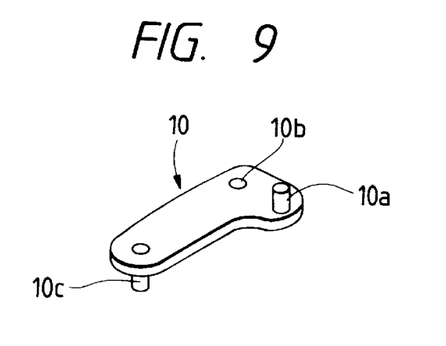
FIG. 9 is a perspective view for showing a cam plate in a magnetic recording and reproducing device of the present invention.

Then, as shown in FIG. 9, an outer shape of the cam plate 10 is formed into a substantial L-shape, wherein a circular pin 10a at its one end is projected above it, a supporting shaft 10b is projected downwardly at a rotating center where the cam plate 10 is rotated, and a circular pin 10c at the other end is projected downwardly in the same direction as that of the supporting shaft 10b, respectively, and they are fixed to the cam plate 10 by calking or the like.

The cam plate 10 having such a configuration as above is arranged on the upper surface of the bottom plate 2a of the casing 2, the supporting shaft 10b is fixed to the bottom plate 2a by calking or the like and then rotatably attached to it.

In addition, the pin 10c at the other side is movably fitted to the arcuate guide groove 2g of the bottom plate 2a and its extremity end is inserted into an elliptical opening groove 3h of the slide member 3.

A washer (not shown) is calked to the extremity end of the pin 10c extending from the opening groove 3h in a downward direction in tension and the aforesaid slide member 3 is slidably attached along the rear surface 2h of the bottom plate 2a.

In addition, the pin 10a is slidably fitted to the cam groove 9c of the spur gear 9.

Such a cam mechanism 8 as above is operated such that as the spur gear 9 is rotated, the pin 10a is moved along the cam groove 9c, and as this pin 10a is moved, the camplate 10 is rotated around a rotating center of the supporting shaft 10b, the pin 10c at the other side is moved within the arcuate guide groove 2g of the casing 2 and the slide member 3 can be slidingly moved in the directions of arrows E and F indicated in FIGS. 10 and 11 along the rear surface 2h of the casing 2.

In addition, as shown in FIG. 10, a magnetic head 11 is fixed to the upper part of a head position setting hole 2e of the casing 2, and a driving roller 12 acting as a rotating means for the transfer roller 14 of the cartridge 4 is arranged near the central part shown in the figure adjacent to the magnetic head 11. Rotation is transmitted from the driving roller 12 from the driving motor or the like not shown, a rubber or the like for use in prohibiting slippage is fitted to its outer circumference and as the transfer roller 14 of the cartridge 4 is press contacted with it, the transfer roller 14 is rotated to enable the magnetic tape 4d to be transferred.

Figure 1:
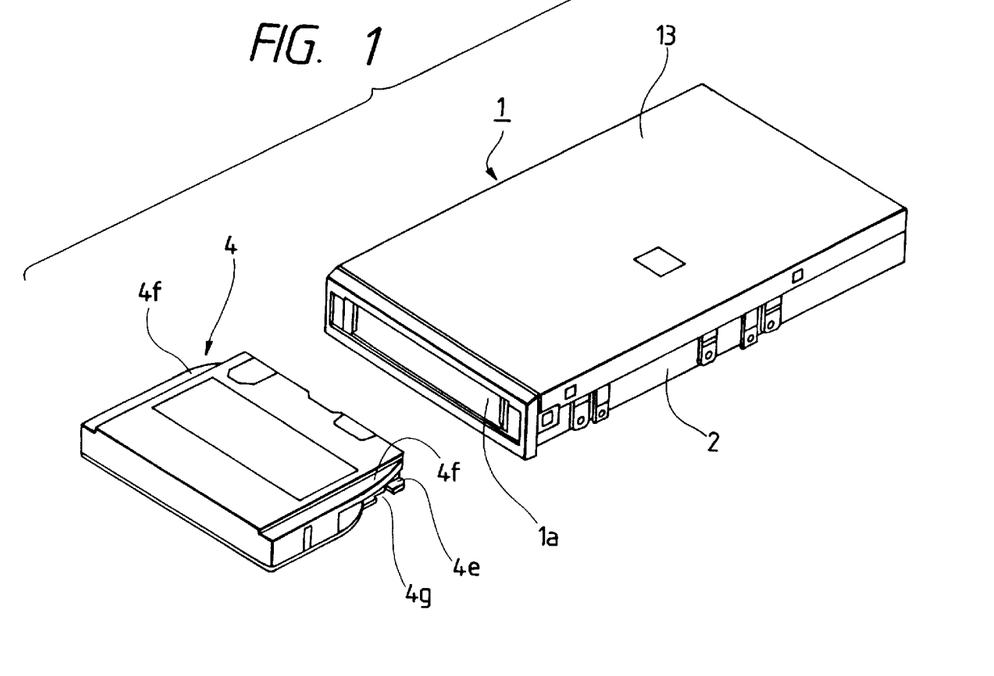
FIG. 1 is a schematic perspective view for showing a magnetic recording and reproducing device of the present invention.

In addition, the cover 13 is fixed above the casing 2 as shown in FIG. 1 so as to close the inner side of the magnetic recording and reproducing device 1.

Referring to FIGS. 10 to 14, an operation of the magnetic recording and reproducing device 1 of the present invention having a constitution as described above will be described.

At first, the device 1 kept at its waiting state before the cartridge 4 is inserted is arranged such that as shown in FIG. 12, the end 3j (3k) of the slide member 3 rides over the slant part of the cam section 2d of the bottom plate 2a of the casing 2, the extremity end side from the rivet 2k of the arm sections 3b (3c) is flexed to a downward direction and the engaging roller 3e is kept at its lowered state by about a half degree of the opening 2c. That is, the end 3j (3k) of the slide member 3 is moved up and down by the cam section 2d, the engaging roller 3e acting as the engaging section can be engaged with or disengaged from the engaging section 4g of the cartridge 4.

The cartridge 4 indicated by a two-dotted line as shown in FIG. 10 is manually pushed into the device 1 in a direction indicated by an arrow D through the cartridge insertion port 1a at the front side of the device 1.

Then, the guide sections 4e, 4f formed at the upper part and the lower part of the cartridge 4 are guided by the guide members (not shown) arranged at both right and left sides in the casing 2, resulting in that the cartridge 4 can be inserted into the device 1.

Then, although the extremity end of the guide section 4e strikes against the engaging roller 3e, the engaging roller 3e is lowered under an action of the cam section 2d, so that the cartridge 4 can be further pushed into the device 1 by a light force and the engaging roller 3e is positioned at the rear surface of the guide section 4e.

Figure 13:
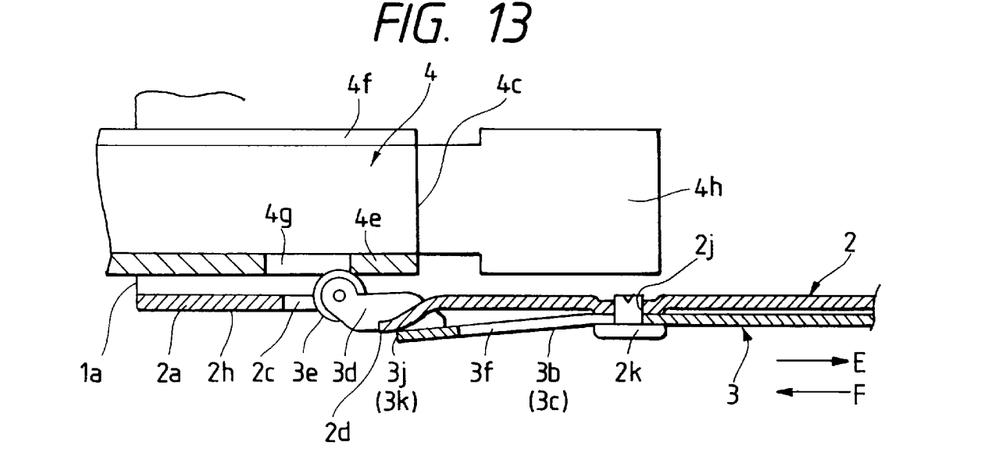
FIG. 13 is a sectional view of a substantial part for illustrating a cartridge loading operation for a magnetic recording and reproducing device of the present invention.

Then, as the cartridge 4 is further pushed into the device 1, the engaging roller 3e is disengaged from the rear surface of the guide section 4e of the cartridge 4, as shown in FIG. 13, and positioned at the engaging section 4g, and the engaging roller 3e is lightly contacted with the end of the engaging section 4g to enable the cartridge 4 to be lightly and temporarily engaged with it.

At this time, a feeling of click is generated at the cartridge 4, and a cartridge detecting sensor (not shown) within the casing 2 is turned ON in a substantial concurrent with the time in which an operator can feel this feeling of click. Then, as the operator feels the feeling of click, the cartridge 4 may not be returned back outside the device 1 even if the operator hands off the cartridge 4 due to the fact that the cartridge 4 is engaged lightly and temporarily as described above.

Then, an inserting operation of the cartridge 4 into the device 21 is performed such that a rotation of the motor 6 is started by turning ON the cartridge detecting sensor, the sliding motion of the slide member 3 is started and the manual operation is changed over to an electrical operation.

Then, as the motor 6 is started to rotate, the spur gear 9 of the cam mechanism 8 is rotated in a counter-clockwise direction as shown in FIG. 10 through the group of gears 7. Then, the cam plate 10 is rotated around the supporting shaft 10b in a counter-clockwise direction along the cam groove 9c of the spur gear 9.

Then, the pin 10c of the cam plate 10 is moved along the guide groove 2g of the casing 2 in a rightward direction as shown in the figure and the motion of the slide member 3 in a direction of an arrow E is started.

Figure 14:
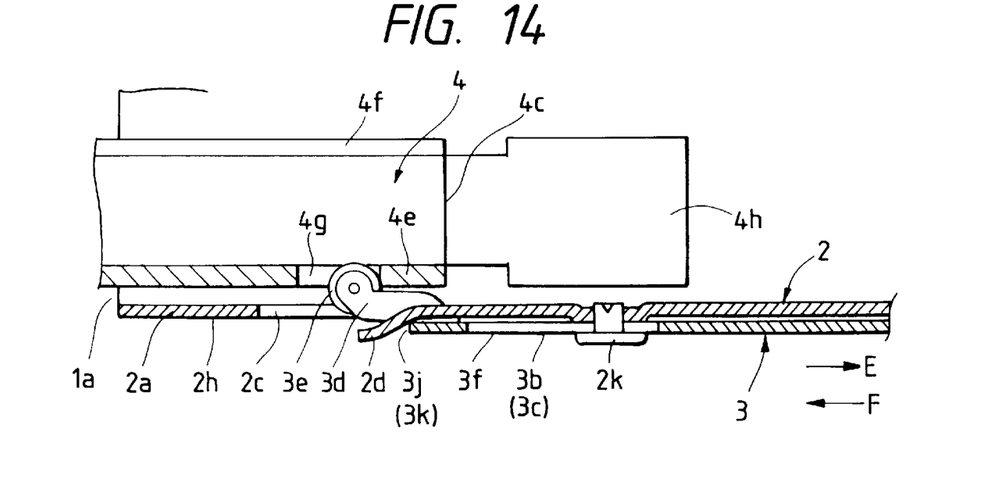
FIG. 14 is a sectional view of a substantial part for illustrating a cartridge loading operation for a magnetic recording and reproducing device of the present invention.

Then, as shown in FIG. 14, the end 3j (3k) of the slide member slips down from the slant part of the cam section 2d of the casing 2 due to a resilient force of the slide member 3, and the arm sections 3b, 3c become in parallel with the rear surface 2h of the bottom plate 2a.

Then, as shown in FIG. 14, the engaging roller 3e is completely engaged with the engaging section 4g of the cartridge 4 so as to engage with the cartridge 4, resulting in that the slide member 3 is slid in a direction indicated by the arrow E and the cartridge 4 is pulled into the device 1.

Next, as the spur gear 9 is further rotated in a counter-clockwise direction to cause the pin 10a of the cam plate 10 to be positioned at a substantial outer-most circumference of the aforesaid cam groove 9c and as shown in FIG. 11, the pin 10c is moved up to the most-right side as shown in the figure of the guide groove 2g of the casing 2 and the slide member 3 is pulled into the deepest section of the device 1.

At this time, the outer circumference of the flange 14a of the transfer roller 14 of the cartridge 4 is press contacted with the outer circumference of the driving roller 12 with a strong force (0.5 to 1 Kgf) and then the motion of the cartridge 4 into the device 1 in an inward direction (a direction indicated by the arrow E) is stopped.

As the spur gear 9 is further rotated in a counter-clockwise direction from this state, the pin 10a is positioned at the other end side 9f which is slightly bent in a direction toward the central hole 9d of the cam groove 9c.

Then, the cam plate 10 is slightly rotated in a clockwise direction and the slide member 3 is slightly returned back in a direction of an arrow F. Then, the transfer roller 14 of the cartridge 4 while being press contacted with the driving roller 12 as described above is moved in such a direction as one moving away from the driving roller 12, resulting in that a slight clearance is formed between the outer circumference of the driving roller 12 and the outer circumference of the transfer roller 14.

That is, the device 1 of the present invention is operated such that the transfer roller 14 and the driving roller 12 are press contacted to each other, thereafter the driving roller 12 and the transfer roller 14 are spaced apart or the press contacting force between both rollers 12, 14 is weakened.

Operation for moving away the driving roller 12 and the transfer 14 or decreasing the press contacting force between both rollers 12, 14 are carried out by moving the transfer roller 14 with the sliding motion of the slide member 3.

In addition, as the driving roller 12 and the transfer roller 14 are moved away from each other or the press contacting force between both rollers 12, 14 is weakened, the pin 10a is positioned at the other end side 9f of the cam groove 9c of the spur gear 9, the top part of the triangle protrusion 9b of the spur gear 9 turns ON a switch (not shown) fixed to a printed circuit board (not shown) at the upper cover 13 and then the rotation of the motor 6 is stopped.

In concurrent with this operation, a driving motor (not shown) for use in rotating the driving roller 12 is rotated and the rotation of the driving roller 12 is energized. At this time, since a slight clearance is formed between the driving roller 12 and the transfer roller 14 and they are spaced apart, so that the driving roller 12 can be energized for rotation with a slight torque.

As the driving roller 12 is rotated by a predetermined number of times, the motor 6 indicated in FIG. 11 is rotated again by an instruction attained from a control circuit not shown and the gear 9 is rotated in a clockwise direction.

Then, as the pin 10a of the cam plate 10 is moved from the other end 9f of the cam groove 9c up to the outer-most circumference of the cam groove 9c, the slide member 3 is slightly slid and moved again in a direction indicated by an arrow E. Then, both rollers 12, 14 approach to each other in such a way that the press contact force between the driving roller 12 and the transfer roller 14 being kept at their rotating state may be increased and then the transfer roller 14 is rotated.

That is, after the driving roller 12 and the transfer roller 14 are moved away from each other or the press contact force between both rollers 12, 14 is weakened, the driving roller is rotated by a predetermined number of rotation and after this operation both rollers 12, 14 are approached from each other in such a way that the press contact force between the driving roller 12 and the transfer roller 14 may be increased and the transfer roller 14 is rotated through rotation of the driving roller 12.

Even if the transfer roller 14 of the cartridge 4 is press contacted with the driving roller 12 while being rotated with a strong force (0.5 to 1 Kgf), it is possible to rotate the transfer roller 14 easily without stopping the rotation of the driving roller 12 with an inertia force of the rotation of the driving roller 12.

Then, reels 4b, 4b are rotated under rotation of the transfer roller 14 to transfer the magnetic tape 4d, wherein the magnetic tape 4d is slidingly contacted with the surface of the magnetic head 11 to enable recording and reproducing operations to be carried out.

In addition, in order to take out the cartridge 4 from the device 1, the motor 6 is rotated in such a direction opposite to the rotation when the cartridge 4 is loaded, under an instruction from a control circuit or the like not shown, resulting in that the spur gear 9 is rotated from the state shown in FIG. 11 in a clockwise direction.

Then, as the camplate 10 is rotated in a clockwise direction, the pin 10c is moved in a leftward direction as viewed in the figure, the slide member 3 is slid and moved in a leftward direction of arrow F as viewed in the figure and further the slide member 3 returns back to the position indicated in FIGS. 10 and 13.

Then, the top part of the triangular protrusion 9b of the spur gear 9 turns ON a switch (not shown) fixed to a printed circuit board (not shown) at the upper cover 13 and motion of the slide member 3 in a direction indicated by an arrow F is stopped.

At this time, as shown in FIG. 13, since the engaging roller 3e of the slide member 3 is approximately disengaged from the engaging section 4g of the cartridge 4, it is possible for an operator to take out the cartridge 4 easily from this state from the device with a slight force.

Then, in concurrent with a completion of the taking-out operation of the cartridge 4, the device 1 becomes a waiting state for waiting a time when the cartridge 4 is inserted.

In addition, as another preferred embodiment of the present invention, it is also possible that the other end 9f of the cam groove 9c is not arranged at the spur gear 9 and the spur gear 9 is slightly rotated in a clockwise direction before the driving motor for rotating the driving roller 12 is energized. Also in this case, since the slide member 3 is slightly moved in the direction indicated by an arrow F, a slight clearance is formed between the driving roller 12 and the transfer roller 14. Then, under this state, the slide member 3 may be operated such that the driving roller 12 and the transfer roller 14 are positioned at a normal abutting position after the driving motor is energized to be rotated by a predetermined number of rotation or after a predetermined time elapses in reference to a timer (not shown).

In addition, as a still further preferred embodiment of the present invention, an operation for moving away the driving roller 12 and the aforesaid transfer roller 14 or weakening a press contact force between both rollers 12, 14 and/or an operation for approaching both rollers 12, 14 so as to strengthen a press contact force between the driving roller 12 and the transfer roller 14 maybe carried out through motion of the driving roller 12.

As one means for moving the driving roller, there may be employed a method in which the driving roller 12 may be fixed to a movable member (not shown) and the movable member is fixed to a solenoid (not shown) or the like.

The magnetic recording and reproducing device of the present invention is constructed such that the cartridge is slidingly moved toward the driving roller while the cartridge is being engaged with the slide member so as to cause the transfer roller and the driving roller to be press contacted to each other and after this operation, the driving roller and the transfer roller are moved away from each other or the press contact force between both rollers is weakened, so that a press contact force of the transfer roller applied to the driving roller is decreased and an energization torque of the driving roller can be reduced and as a driving motor for rotating the driving roller, a motor of low torque can be used and then a low cost can be realized.

In addition, application of the motor of low torque enables a magnetic recording and reproducing device of low consumption power to be provided.

In addition, after the driving roller and the transfer roller are moved away from each other or the press contact force between both rollers is weakened, the driving roller is rotated by the predetermined number of rotation, then both rollers are approached again from each other to increase a contact force between the driving roller and the transfer roller, resulting in that it is possible to provide a magnetic recording and reproducing device of high performance in which even if the transfer roller having a high contact force is press contacted with the rotating driving roller, the transfer roller can be rotated easily with an inertia force of the driving roller and the transfer roller having a high press contact force can be rotated positively with a motor of low torque.

In addition, the driving roller and the transfer roller are moved away from each other or an operation for weakening a press contact force between both rollers and/or an operation for approaching both rollers to each other so as to increase a press contact force between the driving roller and the transfer roller is carried out under a motion of the transfer roller with sliding motion of the slide member, so that it is possible to provide a magnetic recording and reproducing device of the present invention in which the motion of the transfer roller can be performed together with the cam mechanism for slidingly moving the slide member and the number of component parts is not increased.

In addition, the driving roller and the transfer roller are moved away from each other or an operation for weakening a press contact force between both rollers and/or an operation for approaching both rollers to each other so as to increase a press contact force between the driving roller and the transfer roller is carried out under a motion of the driving roller, so that it is possible to provide a magnetic recording and reproducing device in which the motion of the driving roller can be performed with a solenoid or the like by a simple configuration and its cost is low.

What is claimed is:

1. A magnetic recording and reproducing device in which a cartridge storing a magnetic tape therein and having a transfer roller for transferring said magnetic tape is engaged and a driving roller is press contacted with said transfer roller to rotationally drive said transfer roller, wherein there is provided a slide member engaged with said cartridge to cause it to be slidingly moved, said cartridge being slidingly moved toward said driving roller while said cartridge is being engaged with said slide member so as to press contact said transfer roller and said driving roller with each other and then said driving roller and said transfer roller are spaced apart or a press contacting force between both said rollers is weakened, said driving roller is rotated by a predetermined number of rotations and afterwards both rollers again approach to increase the press contact force between said rollers and said transfer roller is rotated through rotation of said driving roller.

2. A magnetic recording and reproducing device according to claim 1, where moving said rollers away from each other or decreasing the press contact force between said rollers, and moving the rollers nearer each other so as to increase the press contact force is carried out by motion of said transfer roller through sliding movement of said slide member.

3. A magnetic recording and reproducing device according to claim 1, wherein moving said rollers away from each other or decreasing the press contact force between said rollers, and moving the rollers nearer each other so as to increase the press contact force is carried out by motion of said driving roller.

4. A magnetic recording and reproducing device according to claim 1, wherein the slide member is moved by a low-torque motor.

5. A magnetic recording and reproducing device according to claim 4, wherein the slide member is moved by the low-torque motor through a mechanism comprising a cam.

6. A magnetic recording and reproducing device according to claim 5, wherein the mechanism further comprises a cam plate.

7. A magnetic recording and reproducing device according to claim 1, wherein the slide member is moved by a solenoid.

8. A method of operating a magnetic recording and reproducing device using a magnetic tape cartridge having a transfer roller, comprising:

inserting a cartridge into the device to engage the transfer roller of the cartridge with a driving roller of the device;

moving the transfer roller out of contact with the driving roller of the device or weakening the contacting force between said rollers;

rotating the driving roller a predetermined number of rotations; and moving the transfer roller back into contact with the driving roller of the device.

9. A method according to claim 8, wherein said moving of the transfer roller is caused by a low-torque motor.

10. A method according to claim 8, wherein said moving of the transfer roller is caused by the low torque motor through a mechanism comprising a cam.

11. A method according to claim 8, wherein said moving of the transfer roller is caused by a solenoid.

* * * * *